US006280571B1

United States Patent
Allen

(10) Patent No.: US 6,280,571 B1
(45) Date of Patent: Aug. 28, 2001

(54) STABILIZER FOR CREPING ADHESIVES

(75) Inventor: Anthony John Allen, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/135,428

(22) Filed: Aug. 17, 1998

(51) Int. Cl.$^7$ ............................................. C08K 3/32
(52) U.S. Cl. ........................ 162/111; 524/414; 524/608
(58) Field of Search ..................... 162/164.3, 181.2, 162/160, 166; 524/414, 608

(56) References Cited

U.S. PATENT DOCUMENTS

| | | |
|---|---|---|
| 3,242,134 | 3/1966 | Papero . |
| 3,342,134 | 9/1967 | Stadler et al. . |
| 4,510,640 | 4/1985 | Omori . |
| 4,684,439 | 8/1987 | Soerens . |
| 4,883,564 | 11/1989 | Chen et al. . |
| 5,179,150 | 1/1993 | Furman, Jr. et al. . |
| 5,181,988 * | 1/1993 | Akutsu et al. .................... 162/181.2 |
| 5,187,219 | 2/1993 | Furman, Jr. . |
| 5,246,544 | 9/1993 | Hollenbrg et al. . |
| 5,256,727 | 10/1993 | Dulany et al. . |
| 5,338,807 | 8/1994 | Espy et al. . |
| 5,370,773 | 12/1994 | Luu et al. . |
| 5,374,334 | 12/1994 | Sommese et al. . |
| 5,382,323 | 1/1995 | Furman, Jr. et al. . |
| 5,393,436 * | 2/1995 | Nagan ............................. 162/181.2 |
| 5,602,209 | 2/1997 | Waarchol et al. . |
| 5,633,309 | 5/1997 | Warchol et al. . |
| 5,660,687 | 8/1997 | Allen et al. . |
| 5,786,429 | 7/1998 | Allen . |
| 5,837,768 | 11/1998 | Warchol et al. . |
| 5,858,171 | 1/1999 | Warchol et al. . |

FOREIGN PATENT DOCUMENTS

| | | |
|---|---|---|
| 979579 | 12/1975 | (CA) . |
| 326175 | 12/1957 | (CH) . |
| 1233595 | 2/1967 | (DE) . |
| 641818 | 3/1995 | (EP) . |
| 814108 | 12/1997 | (EP) . |
| 1391335 | 1/1965 | (FR) . |
| 40-12997 | 6/1940 | (JP) . |
| 68-18609 | 8/1943 | (JP) . |
| 80-017789 | 5/1980 | (JP) . |
| 99/02486 | 1/1999 | (WO) . |

OTHER PUBLICATIONS

Comprehensive Inorganic Chemistry, by Pergamon Press, 1973, pp. 468–472.
Smook, *Handbook for Pulp and Paper Technologist*, Second Edition, Angus Wilde Publications, Bellingham, WA, pp. 317 (1992).
English language abstract of DE 12 33 595.
English language abstract of FR 1.391.335.
English language abstract of JP 68–18609.
English language abstract of JP 80–017789.
English language abstract of WO 99/02486.

* cited by examiner

Primary Examiner—Peter Chin
(74) Attorney, Agent, or Firm—Greenblum & Bernstein, P.L.C.

(57) ABSTRACT

Composition comprising at least one water soluble polymer, such as polyamidoamine-epichlorohydrin resin, polyamine-epichlorohydrin resin, polyvinyl alcohol, etc. and at least one stabilizer, such as hypophosphorous acid, phosphorous acid, hypodiphosphoric acid, etc. and salts thereof, suitable as creping adhesive for paper.

32 Claims, No Drawings

STABILIZER FOR CREPING ADHESIVES

BACKGROUND OF THE INVENTION

1. Field of the Invention

The present invention relates to stabilizer for creping adhesives and more Particularly it relates to a creping composition comprising water soluble polymer and stabilizer comprising certain acids or salts thereof.

2. Description of the Prior Art

The creping process is commonly practiced in the manufacture of tissue and towel grades of paper. This process involves scraping the dried paper web from a drying cylinder (Yankee dryer) by the use of a creping doctor blade. The creping action imparts a fine, rippled texture to the sheet and also increases the bulk of the sheet, resulting in improved softness and absorbency. An adhesive formulation is often used to control the adherence of the paper sheet to the Yankee dryer. In this regard, fibrous webs, particularly paper webs, are conventionally subjected to the creping process in order to give them desirable textural characteristics, such as softness and bulk. The creping process typically involves applying creping adhesive—generally in the form of an aqueous solution, emulsion or dispersion—to a drying surface for the web; preferably, this surface is the surface of a rotating creping cylinder, such as the apparatus known as a Yankee dryer. The web is then adhered to the indicated surface. It is subsequently dislodged from the surface with a creping device—preferably, a doctor blade. The impact of the web against the creping device ruptures some of the fiber-to-fiber bonds within the web, causing the web to wrinkle or pucker. The creping adhesive solution, emulsion or dispersion can be comprised of one or more adhesive components, typically water-soluble polymers, and may also contain one or more release agent components as well as other desired additives that may affect the creping process. This is known as the creping adhesive package. This adhesive is exposed to high temperatures (on the ordeir of 100° C.) and high mechanical shear at the creping blade. Given these conditions, one could expect the adhesive formulation to undergo thermooxidative degradation in the presence of atmospheric oxygen. In fact, dark gummy deposits are sometimes observed on the creping blade or Yankee dryer. these deposits are probably thermooxidative degradation products of the creping adhesive formulation and can cause disruptions in the papermaking process. The present invention describes additives for the creping adhesive formulation that significantly reduce the degradation of the creping adhesive formulation under its expected use conditions.

Espy & Maslanka, U.S. Pat. No. 5,338,807 and Espy & Giles, Canadian Patent 979,579 disclose polyamidoamine-epichlorohydrin resins (PAE resins) as adhesives in the creping process for producing tissue and towel paper products.

A number of patents disclose the use of hypophosphorous acid and its salts as antioxidant in polymeric formulations. These include Papero, U.S. Pat. No. 3,242,134 closing use as a stabilizer for polyamides, Yoshitomi, Nagakura and Matsunuma, Japanese Patent 12,997 disclosing use as an antioxidant in the preparation of alkyd resins, Schuler, Swiss Patent 326,175 disclosing use as a light stabilizer for poly(vinyl chloride) and French Patent 1,391,335 (Imperial Chemical Industries Ltd.) disclosing use as a stabilizer in the preparation of polyurethane foams.

The polymers described in the prior art as stabilized by hypophosphorous acid and its salts are all water-insoluble materials. There is no indication given in the prior art that these stabilizers would work in an aqueous system with a water-soluble polymer.

Chen U.S. Pat. No. 4,883,564 discloses a ci-eping adhesive comprising water-soluble binder (polyvinyl alcohol) and a phosphate salt in order to reduce the hard film build up on the creping surface of the drum dryer.

There is no disclosure in the above references of additives used to impart thermal stability to the creping adhesive compositions.

There is no mention in the above references of oxidative instability neither of polyamidoamine-epichlorohydrin or polyamine-epichlorohydrin resins nor of the use of hypophosphorous acid and its salts as stabilizers for polyamidoamine-epichlorohydrin or polyamine-epichlorohydrin creping adhesives.

SUMMARY OF THE INVENTION

According to the present invention there is provided a composition comprising at least one water soluble polymer selected from the group consisting of polyamidoamine-epichlorohydrin resin, polyamine epichlorohydrin resin, polyacrylamide, polyvinyl alcohol, polyvinylamine, polyethyleneimine, polymethacrylamide, poly(acrylic acid), poly(methacrylic acid), poly(hydroxyethyl acrylate), poly(hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines and silylated polyamidoamines; and at least one stabilizer selected from the group consisting of hypophosphorous acid, phosphorous acid, hypodiphosphoric acid, diphosphorous acid, hypophosphoric acid, pyrophosphorous acid and salts of any of these acids.

Further provided according to the present invention are creping adhesives comprising at least one of the above water soluble polymers and at least one of the above stabilizers.

Provided according to the present invention there are processes of forming creped paper comprising: (a) applying the water soluble polymer and stabilizer of the present invention to a drying surface for fibrous web, (b) pressing a fibrous web against the drying surface to adhere the fibrous web to the drying surface, and (c) dislodging the fibrous web from the drying surface with a creping device to crepe the fibrous web.

DETAILED DESCRIPTION OF THE INVENTION

Surprisingly it has been discovered that certain acids, such as phosphorous acid, hypophosphorous acid etc. and their salts are effective additives in preventing thermal degradation of water soluble polymers, e.g., polyamidoamine-epichlorohydrin and polyamine-epichlorohydrin resins. This type of stabilizer should be useful in the manufacture of tissue papers and paper toweling by providing a more stable creping adhesive coating on the Yankee dryer.

In the context of the present application the term "polymer" is intended to include homopolymers as well as copolymers.

The stabilizers have been shown to be effective in reducing color formation and charring of water soluble polymers, such as polyamidoamine-epichlorohydrin and polyamine-epichlorohydrin resins at levels, of about 1 to 5%.

The water soluble polymer suitable for the present invention can be selected from the group consisting of polyamidoamine-epichlorohydrin resin, polyamine epichlorohydrin resin, polyvinyl alcohol, polyvinylamine, polyethyleneimine, acrylamide polymers, polymethacrylamide, poly(acrylic acid), poly(methacrylic acid), poly(hydroxyethyl acrylate), poly(hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines and their reaction product with epichlorohydrin and silylated polyamidoamines. Preferably the water-soluble polymer is selected from the group consisting of polyamidoamine-epichlorohydrin resin, polyamine-epichlorohydrin resin, highly branched polyamidoamines, silylated polyamidoamines, polyvinyl alcohol, polyvinylamine, polyethyleneimine, acrylamide polymers, poly(N-vinyl pyrrolidinone), hydroxyethylcellulose and carboxymethylcellulose, and most preferably they are selected from the group consisting of polyamidoamine-epichlorohydrin resin, polyamine-epichlorohydrin resin, highly branched polyamidoamines, silylated polyamidoamines, polyvinyl alcohol, polyvinylamine and polyethyleneimine.

The stabilizer is selected from the group consisting of hypophosphorous acid, phosphorous acid, hypodiphosphoric acid, diphosphorous acid, hypophosphoric acid, pyrophosphorous acid and salts of any of these acids. Preferably the stabilizer is hypophosphorous acid, phosphorous acid, hypodiphosphoric acid, diphosphorous acid, hypophosphoric acid, pyrophosphorous acid, sodium hypophosphite, potassium hypophosphite, lithium hypophosphite, calcium hypophosphite, manganese hypophosphite, magnesium hypophosphite, ammonium hypophosphite, phosphorous acid sodium salt, phosphorous acid potassium salt, phosphorous acid lithium salt, phosphorous acid calcium salt, phosphorous acid magnesium salt, phosphorous acid manganese salt and phosphorous acid ammonium salt and most preferably the acidic compound is hypophosphorous acid, phosphorous acid, sodium hypophosphite, potassium hypophosphite, manganese hypophosphite, ammonium hypophosphite, phosphorous acid sodium salt, phosphorous acid potassium salt and phosphorous acid ammonium salt.

The water soluble polymer can be present in an amount of at least about 25% based upon total weight of water soluble polymer and stabilizer, and preferably at least about 50%. The water soluble polymer can be present in an amount of up to about 99.99%, preferably up to about 99.75%. The stabilizer can be present in an amount of at least about 0.01%, based upon title weight of water soluble polymer and stabilizer, preferably in an amount of at least about 0.25%. The stabilizer can be present in an amount of up to about 75%, preferably in an amount of up to about 15%. Additional components of the creping package may be the creping release agents disclosed in U.S. Pat. No. 5,660,687 (Allen and Lock) the disclosure of which reference is hereby incorporated by reference in its entirety. Suitable release agents include, for example, aliphatic polyols or oligomers thereof having a number average molecular weight of less than 600, polyalkanolamines, aromatic sulfonamides, pyrrolidone, and mixtures thereof. Specific examples of release agents include, for example, ethylene glycol; propylene glycol; diethylene glycol; glycerol; pyrrolidone; triethanolamine; diethanolamine; polyethylene glycol; dipropylene glycol; Uniplex 108, an aromatic sulfonamide available from Unitex Chemical Corporation, Greenville, N.C., USA, and mixtures thereof. Other components of the creping package may also be the polyalkanoamide tackifiers described in U.S. application Ser. No.081891,199, filed Jul. 10, 1997 (Allen). In addition, the creping adhesive composition can contain release agents, (typical oil-based formulations) surfactants, dispersants, salts to adjust the water hardness, acids or bases to adjust the pH of the creping adhesive composition or other useful additives. The use of such adhesive formulations can provide improved product quality and better control of the papermaking process.

The addition of the various phosphorous or hypophosphorous acids or their salts to formulations of typical polyamidoamine-epichlorohydrin and polyamine-epichlorohydrin creping adhesives has markedly improved thermooxidative stability of these materials. Visual examination of samples that were subjected to high temperatures (150 or 200° C.) for 30 minutes showed that the formulations that included 1 to 5% hypophosphite or phosphorous acid were much lighter in color than the control samples. The control samples acquired a very dark brown charred appearance while the samples with added stabilizer were light to golden yellow in color. The resistance of the stabilized formulations to darkening and charring indicate an improvement in the thermooxidative stability of the creping adhesive formulation. Thus one would expect increased durability and stability of a creping adhesive composition containing the stabilizers of this invention, which would be expected to result in improved performance of the paper machine and possibly, improved product quality. The compositions of the present invention may also be advantageous in providing improved creping performance at higher paper machine speeds. This ability to reduce color formation in creping adhesive compositions has also been quantified by a spectrophotometric technique, which is discussed in the Examples.

The composition of the present invention can be used advantageously in the process of creping paper. The creping process according to the present invention can include the steps of applying the stabilizer and creping adhesive either separately or combined, preferably combined as the creping adhesive package to a drying surface for fibrous web, providing a fibrous web, pressing the fibrous web against the drying surface to adhere this web to the surface, and dislodging the fibrous web from the drying surface with a creping device to crepe the fibrous web.

The various hypophosphorous and phosphorous acids and their salts will also improve the thermooxidative stability of other synthetic, naturally occurring or synthetically-modified natural water-soluble polymers and copolymers such as polyvinyl alcohol, polyvinylamine, polyethyleneimine, polyacrylamide, polymethacrylamide, poly(acrylic acid), poly(methacrylic acid), poly(hydroxyethyl acrylate), poly(hydroxyethyl methacrylate), poly(n-vinyl pyrrolidinone), poly(ethylene oxide) [poly(ethylene glycol)], hydroxyethyl cellulose (HEC), hydroxypropyl cellulose (HPC), guar gum, starch, agar, chitosan, alginic acid, and carboxymethyl cellulose (CMC). Other useful water-soluble polymers are the highly branched polyamidoamines and their reaction product with epichlorohydrin disclosed in U.S. application Ser. No. 08/634,226, filed Apr. 18, 1996, now U.S. Pat. No. 5,786,429, the disclosure of which reference is hereby incorporated by reference in its entirety. These polyamidoamines are preferably characterized by a highly branched structure that lacks the reactive intralinker functionality of the wet strength and creping adhesive resins in the prior art. This highly branched structure results from reacting a prepolymer of controlled molecular weight:—especially a prepolymer of predetermined low molecular weight—with the requisite amount of epichlorohydrin or other intralinking agent.

Further these intralinked polyamidoamines are preferably non thermosetting and endcapped intralinked polyamidoamines. Also as a matter of preference, the intralinked polyamidoamines are free or substantially free of reactive intralinker functionality.

The intralinked polyamidoamines preferably comprise the reaction product of reactants which include at least one dicarboxylic acid or dicarboxylic acid derivative, at least one polyamine, at least one endcapping agent, and at least one intralinker. The at least one endcapping agent preferably comprises at least one member selected from the group consisting of monofunctional amines, monofunctional carboxylic acids, and monofunctional carboxylic acid esters.

Further the intralinked polyamidoarnines preferably comprise the reaction product of an endcapped polyamidoamine prepolymer and the at least one intralinker. The endcapped polyamidoamine prepolymer itself preferably comprises the reaction product of the at least one dicarboxylic acid or dicarboxylic acid derivative, the at least one polyamine, and the at least one endcapping agent.

Also as a matter of preference, the endcapped polyamidoamine prepolymer is free or substantially free of amine and carboxyl end groups. Additionally, the endcapped polyamidoamine prepolymer preferably comprises alternating dicarboxylic acid and polyamine residues, and endcaps lacking carboxyl and amine functionality; yet further, the endcaps are preferably amide endcaps.

The endcapped polyamidoamine prepolymer preferably has a $DP_n$ of about 2 to about 50—more preferably about 3 to about 25, and still more preferably about 3 to about 10. Also as a matter of preference, the mole ratio of the at least one intralinker, to intralinker reactive amine groups in the endcapped polyamidoamine prepolymer, is between about ½$[1/(DP_n-1)]$ and about $1/(DP_n-1)$. Also useful as the water-soluble polymers are the silyl-linked polyamidoamines disclosed in U.S. application Ser. No. 08/665,965, filed Jun. 19, 1996 the disclosure of which reference is hereby incorporated by reference in its entirety.

Preferably, the silyl-linked polyamidoamines are thermosetting. Also as a matter of preference, they are soluble in an aqueous medium.

These silylated polyamidoamines can comprise the reaction product of reactants which comprise at least one dicarboxylic acid or dicarboxylic acid derivative, at least one polyamine, and at least one silylating agent. The reactants further can comprise at least one cationizing agent, and/or at least one endcapping agent.

Particularly, the silylated polyamidoamines can comprise the reaction product of the at least one silylating agent, and a polyamidoamine prepolymer comprising the reaction product of the at least one dicarboxylic acid or dicarboxylic acid derivative and the at least one polyamine; the reactants for preparing the prepolymer can also include at least one endcapping agent. Preferably, the at least one silylating agent comprises at least one functionality capable of reacting with amine groups in the polyamidoamine prepolymer, and at least one hydrolyzable site.

Also as a matter of preference, the mole ratio of the at least one silylating agent, to silylating agent reactive amine groups in the polyamidoamine prepolymer, is between about 0.05 and about 2.0. This mole ratio is more preferably between about 0.1 and about 0.75, and between about 0.15 and about 0.5 as a matter of particular preference.

Other possible uses of the stabilized polymers of the present invention are as improved wet strength agents for paper, in adhesive compositions, as textile fiber treatments, as dispersant, as improved dispersants and/or promotor resins in paper sizing compositions and as components of paper coating formulations.

The scope of the present invention as claimed is not intended to be limited by the following Examples which are given merely by way of illustration. All parts and percentages are by weight unless otherwise indicated.

Examples 1 to 36 and Comparative
Examples 1 to 4

In order to test the thermooxidative stability of resin/stabilizer formulations an accelerated aging test was performed which involved heating samples in a forced air oven and then determining their color. Acqueous solutions of Crepetrol® 80E and Kymene® 557LX polyamidoamine-epichlorohydrin resins available from Hercules Incorporated and Crepetrol® 73 polyamine-epichlorohydrin resin available from Hercules Incorporated were mixed with candidate stabilizers and were placed in aluminum weighing pans measuring 55 mm diameter×15 mm high. The total amount of resin and stabilizer added was 2.00 g. The resin formulations were dried in a forced air oven for 30 minutes at either 150° C. or 200° C. After removing from the oven the samples were stored in a dessicator until the color determinations were performed. Color determination was done with a Spectrogard Color System spectrophotometer made by BYK-Gardner USA. The yellowness of the samples was determined according to ASTM method D-1925-70, standard test method for yellowness index of plastics.

Yellowness index results for Crepetrol® 80E resin/stabilizer combinations are listed in Table 1. Yellowness index results of Kymene® 557LX and Crepetrol® 73 resins in combination with stabilizers are shown in Table 2. Addition of the hypophosphite and phosphorous acid stabilizers reduced the yellowness of all samples significantly at the concentrations tested (1, 2.5 and 5%) and the reduction in the yellowness index was generally directly proportional to the amount of stabilizer added.

TABLE 1

Crepetrol ® 80E Resin/Stabilizer Formulations

| Example | Adhesive | Stabilizer | Temp. (° C.) | pH[1] | Yellowness Index[2] |
|---------|----------|------------|--------------|-------|---------------------|
| C-1 | C-80E | None (control) | 200 | 3.92 | 116.0 |
| 1 | C-80E | 1.0% Sodium hypophosphite | 200 | 3.92 | 58.9 |
| 2 | C-80E | 2.5% Sodium hypophosphite | 200 | 3.93 | 31.6 |
| 3 | C-80E | 5.0% Sodium hypophosphite | 200 | 3.94 | 17.0 |
| 4 | C-80E | 1.0% Manganese hypophosphite | 200 | 3.90 | 57.9 |
| 5 | C-80E | 2.5% Manganese hypophosphite | 200 | 3.87 | 54.6 |

TABLE 1-continued

Crepetrol ® 80E Resin/Stabilizer Formulations

| Example | Adhesive | Stabilizer | Temp. (° C.) | pH[1] | Yellowness Index[2] |
|---|---|---|---|---|---|
| 6 | C-80E | 5.0% Manganese hypophosphite | 200 | 3.90 | 37.6 |
| 7 | C-80E | 1.0% Phosphorous acid | 200 | 3.27 | 71.6 |
| 8 | C-80E | 2.5% Phosphorous acid | 200 | 2.12 | 29.7 |
| 9 | C-80E | 5.0% Phosphorous acid | 200 | 1.61 | 27.3 |
| C-2 | C-80E | None (control) | 150 | 3.92 | 113.3 |
| 10 | C-80E | 1.0% Sodium hypophosphite | 150 | 3.92 | 86.8 |
| 11 | C-80E | 2.5% Sodium hypophosphite | 150 | 3.93 | 37.6 |
| 12 | C-80E | 5.0% Sodium hypophosphite | 150 | 3.94 | 26.8 |
| 13 | C-80E | 1.0% Manganese hypophosphite | 150 | 3.90 | 90.7 |
| 14 | C-80E | 2.5% Manganese hypophosphite | 150 | 3.87 | 53.3 |
| 15 | C-80E | 5.0% Manganese hypophosphite | 150 | 3.90 | 36.7 |
| 16 | C-80E | 1.0% Phosphorous acid | 150 | 3.27 | 79.7 |
| 17 | C-80E | 2.5% Phosphorous acid | 150 | 2.12 | 49.7 |
| 18 | C-80E | 5.0% Phosphorous acid | 150 | 1.61 | 28.2 |

[1]Measured prior to drying.
[2]Determined by ASTMD-1925-70, Standard Test Method for Yellowness Index of Plastics

TABLE 2

Kymene ® 557LX and Crepetrol ® 73 Resins with Stabilizers

| Example | Adhesive | Stabilizer | Temp. (° C.) | pH | Yellowness Index[1] |
|---|---|---|---|---|---|
| C-3 | K-557LX | None (control) | 150 | 3.48 | 111.2 |
| 19 | K-557LX | 1.0% Sodium hypophosphite | 150 | 3.56 | 84.7 |
| 20 | K-557LX | 2.5% Sodium hypophosphite | 150 | 3.57 | 80.9 |
| 21 | K-557LX | 5.0% Sodium hypophosphite | 150 | 3.59 | 60.8 |
| 22 | K-557LX | 1.0% Manganese hypophosphite | 150 | 3.49 | 96.6 |
| 23 | K-557LX | 2.5% Manganese hypophosphite | 150 | 3.53 | 85.5 |
| 24 | K-557LX | 5.0% Manganese hypophosphite | 150 | 3.55 | 79.6 |
| 25 | K-557LX | 1.0% Phosphorous acid | 150 | 2.72 | 86.8 |
| 26 | K-557LX | 2.5% Phosphorous acid | 150 | 1.99 | 67.0 |
| 27 | K-557LX | 5.0% Phosphorous acid | 150 | 1.42 | 76.7 |
| C-4 | C-73 | None (control) | 150 | 4.02 | 68.7 |
| 28 | C-73 | 1.0% Sodium hypophosphite | 150 | 3.90 | 52.1 |
| 29 | C-73 | 2.5% Sodium hypophosphite | 150 | 3.91 | 22.0 |
| 30 | C-73 | 5.0% Sodium hypophosphite | 150 | 3.97 | 28.3 |
| 31 | C-73 | 1.0% Manganese hypophosphite | 150 | 3.92 | 42.3 |
| 32 | C-73 | 2.5% Manganese hypophosphite | 150 | 3.90 | 24.2 |
| 33 | C-73 | 5.0% Manganese hypophosphite | 150 | 3.87 | 15.6 |
| 34 | C-73 | 1.0% Phosphorous acid | 150 | 2.47 | 51.4 |
| 35 | C-73 | 2.5% Phosphorous acid | 150 | 1.35 | 65.4 |
| 36 | C-73 | 5.0% Phosphorous acid | 150 | 0.83 | 65.0 |

[1]Determined by ASTMD-1925-70, Standard Test Method for Yellowness Index of Plastics.

What is claimed is:

1. An aqueous composition comprising at least one water soluble polymer comprising at least one of polyamidoamine-epichlorohydrin resin polyamine-epichlorohydrin resin, reaction products of epichlorohydrin with highly branched polyamidoamines and polyvinyl alcohol; and at least one stabilizer present in an amount effective to stabilize the water soluble polymer against thermooxidative degradation, said at least one stabilizer comprising at least one of hypophosphorous acid, phosphorous acid, hypodiphosphioric acid, diphosphiorous acid, hypophosphioric acid, pyrophosphiorous acid and salts of any of these acids.

2. The composition of claim 1 wherein the at least one water soluble polymer comprises at least one of polyamidoamine-epichlorohydrin resin, polyamine-epichlorohydrin resin and reaction products of epichlorohydrin with highly branched polyamidoamines.

3. The composition of claim 1 wherein the at least one stabilizer comprises at least one of hypophosphorous acid, phosphorous acid, hypodiphosphoric acid, diphosphorous acid, hypophosphoric acid, pyrophosphorous acid, sodium hypophosphite, potassium hypophosphite, lithium hypophosphite, calcium hypophosphite, manganese hypophosphite, magnesium hypophosphite, ammonium hypophosphite, phosphorous acid sodium salt, phosphorous acid potassium salt, phosphorous acid lithium salt, phosphorous acid calcium salt, phosphorous acid magnesium salt, phosphorous acid manganese salt and phosphorous acid ammonium salt.

4. The composition of claim 1 wherein the at least one water soluble polymer is present in an amount of at least about 25% based upon total weight of said at least one water soluble polymer and said at least one stabilizer.

5. The composition of claim 1 wherein the at least one water soluble polymer is present in an amount of up to about 99.99% based upon total weight of said at least one water soluble polymer and said at least one stabilizer.

6. The composition of claim 1 wherein the at least one stabilizer is present in an amount of at least about 0.01% based upon total weight of said at least one water soluble polymer and said at least one stabilizer.

7. The composition of claim 1 wherein the at least one stabilizer is present in an amount of up to about 75% based upon total weight of said at least one water soluble polymer and said at least one stabilizer.

8. The composition of claim 2 wherein the at least one stabilizer comprises at least one of hypophosphorous acid, phosphorous acid, hypodiphosphoric acid, diphosphorous acid, hypophosphoric acid, pyrophosphorous acid, sodium hypophosphite, potassium hypophosphite, lithium hypophosphite, calcium hypophosphite, manganese hypophosphite, magnesium hypophosphite, ammonium hypophosphite, phosphorous acid sodium salt, phosphorous acid potassium salt, phosphorous acid lithium salt, phosphorous acid calcium salt, phosphorous acid magnesium salt, phosphorous acid manganese salt and phosphorous acid ammonium salt, the at least one water soluble polymer is present in an amount of from about 25 to about 99.99% based upon total weight of said at least one water soluble polymer and said at least one stabilizer, and the at least one stabilizer is present in an amount of at least about 0.01 to about 75% based upon total weight of said at least one water soluble polymer and said at least one stabilizer.

9. The composition of claim 8 wherein the at least one water soluble polymer comprises at least one of polyamidoaminie-epichlorohydrin resin polyamine-epichlorohydrin resin and reaction products of epichlorohydrin with highly branched polyamidoamines.

10. The composition of claim 8 wherein the at least one stabilizer comprises at least one of hypophosphorous acid, phosphorous acid, sodium hypophosphite, potassium hypophosphite, manganese hypophosphite, ammonium hypophosphite, phosphorous acid sodium salt, phosphorous acid potassium salt and phosphorous acid ammonium salt.

11. The composition of claim 8 wherein the at least one water soluble polymer is present in an amount of at least about 50% based upon total weight of said at least one water soluble polymer and said at least one stabilizer.

12. The composition of claim 8 wherein the at least one water soluble polymer is present in an amount of up to about 99.75% based upon total weight of said at least one water soluble polymer and said at least one stabilizer.

13. The composition of claim 8 wherein the at least one stabilizer is present in an amount of at least about 0.25% based upon total weight of said at least one water soluble polymer and said at least one stabilizer.

14. The composition of claim 8 wherein the at least one stabilizer is present in an amount of up to about 75% based upon total weight of said at least one water soluble polymer and said at least one stabilizer.

15. The composition of claim 9 wherein the at least one stabilizer comprises at least one of hypophosphorous acid, phosphorous acid, sodium hypophosphite, potassium hypophosphite, manganese hypophosphite, ammonium hypophosphite, phosphorous acid sodium salt, phosphorous acid potassium salt and phosphorous acid ammonium salt, the at least one water soluble polymer is present in an amount of from about 50 to about 99.75% based upon total weight of said at least one water soluble polymer and said at least one stabilizer, and the at least one stabilizer is present in an amount of from about 0.25 to about 75% based upon total weight of said at least one water soluble polymer and said at least one stabilizer.

16. A drying surface for a fibrous web including on said surface a creping adhesive comprising the composition of claim 1.

17. A drying surface for a fibrous web including on said surface a creping adhesive comprising the composition of claim 8.

18. A drying surface for a fibrous web including on said surface a creping adhesive comprising the composition of claim 15.

19. The drying surface according to claim 16 wherein the composition includes at least one of release agent, surfactant, dispersant, bases and acids and salts other than hypophosphorous acid, phosphorous acid, hypodiphosphoric acid, diphosphorous acid, hypophosphoric acid, pyrophosphorous acid and salts thereof.

20. The drying surface according to claim 17 wherein the composition includes at least one of release agent, surfactant, dispersant, bases and acids and salts other than hypophosphorous acid, phosphorous acid, hypodiphosphoric acid, diphosphorous acid, hypophosphoric acid, pyrophosphorous acid and salts thereof.

21. The drying surface according to claim 18 wherein the composition includes at least one of release agent, surfactant, dispersant, bases and acids and salts other than hypophosphorous acid, phosphorous acid, hypodiphosphoric acid, diphosphorous acid, hypophosphoric acid, pyrophosphorous acid and salts thereof.

22. The composition of claim 1 wherein the at least one water soluble polymer comprises at least one of polyamidoamine-epichlorohydrin resin, polyamine-epichlorohydrin resin and polyvinyl alcohol.

23. The composition of claim 22 wherein the at least one water soluble polymer is present in an amount of at least about 25% based upon total weight of said at least one water soluble polymer and said at least one stabilizer.

24. The composition of claim 23 wherein the at least one water soluble polymer is present in an amount of at least about 50% based upon total weight of said at least one water soluble polymer and said at least one stabilizer.

25. The composition of claim 23 wherein the at least one stabilizer is present in an amount of from about 0.01 to about 75% based upon total weight of said at least one water soluble polymer and said at least one stabilizer.

26. The composition of claim 25 wherein the at least one stabilizer is present in amount up to about 15% based upon total weight of said at least one water soluble polymer and said at least one stabilizer.

27. The composition of claim 26 wherein the at least one water soluble polymer comprises at least one of polyamidoamine-epichlorohydrin resin and polyamine-epichlorohydrin resin.

28. The composition of claim 26 wherein the at least one water soluble polymer comprises polyamidoamine-epichlorohydrin resin.

29. The composition of claim 26 wherein the at least one water soluble polymer comprises polyamine-epichlorohydrin resin.

30. The composition according to claim 26 wherein the at least one water soluble polymer comprises polyvinyl alcohol.

31. The composition of claim 26 wherein the at least one water soluble polymer comprises polyamidoamine-epichlorohydrin resin and polyvinyl alcohol.

32. The composition of claim 26 wherein the at least one water soluble polymer comprises polyamine-epichlorohydrin resin and polyvinyl alcohol.

* * * * *